(12) United States Patent
Feenstra et al.

(10) Patent No.: US 7,903,317 B2
(45) Date of Patent: Mar. 8, 2011

(54) TRANSFLECTIVE ELECTROWETTING DISPLAY DEVICE

(75) Inventors: Bokke Johannes Feenstra, Nuenen (NL); Roy Van Dijk, Eindhoven (NL); Andrea Giraldo, Den Bosch (NL); Robert A. Hayes, Shatin (HK)

(73) Assignee: Liquavista B.V., Eindhoven (NL)

( * ) Notice: Subject to any disclaimer, the term of this patent is extended or adjusted under 35 U.S.C. 154(b) by 0 days.

(21) Appl. No.: 12/303,479

(22) PCT Filed: Jun. 1, 2007

(86) PCT No.: PCT/EP2007/055423
§ 371 (c)(1), (2), (4) Date: Jul. 24, 2009

(87) PCT Pub. No.: WO2007/141220
PCT Pub. Date: Dec. 13, 2007

(65) Prior Publication Data
US 2009/0284824 A1    Nov. 19, 2009

(30) Foreign Application Priority Data
Jun. 6, 2006 (GB) .................................. 0611125.6

(51) Int. Cl.
*G02B 26/00* (2006.01)
*G02F 1/03* (2006.01)
(52) U.S. Cl. .......................... 359/291; 359/237; 359/245
(58) Field of Classification Search .......... 359/290–292, 359/295, 223–225, 243, 260–263, 298, 198, 359/301–303, 315–318, 237, 242, 253, 276, 359/238, 245, 259, 244
See application file for complete search history.

(56) References Cited

U.S. PATENT DOCUMENTS
6,621,541 B1    9/2003    Choi
(Continued)

FOREIGN PATENT DOCUMENTS
WO    2004/008238    1/2004
(Continued)

OTHER PUBLICATIONS

United Kingdom Search Report dated Sep. 14, 2006 issued in corresponding U.K. Application No. GB0611125.6.

(Continued)

*Primary Examiner* — Scott J Sugarman
*Assistant Examiner* — Dawayne A Pinkney
(74) *Attorney, Agent, or Firm* — BainwoodHuang

(57) ABSTRACT

A transflective display device has a viewing side (7) and a rear side (8) and comprises a plurality of electrowetting elements (2) having a first support plate (5) facing the viewing side and a second support plate (6) facing the rear side. Each electrowetting element comprises a space (10) between the first support plate and the second support plate and includes a first fluid (11) and a second fluid (12) immiscible with each other. The second fluid absorbs at least a part of the optical spectrum. The position of the second fluid is controllable to cover a predetermined area (30) of the cross-section (29) of the space in the plane of the second support plate. A structured reflector (18) is arranged on the second support plate, comprising within the cross-section an area (33, 34) transparent for light incident from the rear side and an area (35, 36) reflective for light incident from the viewing side. The transparent area and the reflective area are arranged such that the predetermined area (30) covered by the second fluid covers the same proportion of the transparent area and the reflective area.

11 Claims, 4 Drawing Sheets

U.S. PATENT DOCUMENTS

| | | |
|---|---|---|
| 7,027,118 B1 | 4/2006 | Wu et al. |
| 2003/0035199 A1 | 2/2003 | Liang et al. |
| 2005/0128389 A1 | 6/2005 | Yang |
| 2005/0275933 A1 | 12/2005 | Johnson et al. |
| 2006/0077330 A1* | 4/2006 | Ijzerman et al. ............... 349/143 |
| 2007/0279727 A1* | 12/2007 | Gandhi et al. ................. 359/242 |
| 2008/0297880 A1* | 12/2008 | Steckl et al. .................. 359/291 |

FOREIGN PATENT DOCUMENTS

| | | |
|---|---|---|
| WO | WO 2005/038764 | 4/2005 |
| WO | 2005/098797 | 10/2005 |
| WO | WO 2006/017129 | 2/2006 |
| WO | WO 2006/021912 | 3/2006 |
| WO | 2006/050793 A1 | 5/2006 |

OTHER PUBLICATIONS

International Search Report for PCT/EP2007/055423, mailed Sep. 18, 2007.

Written Opinion of the International Searching Authority for PCT/EP2007/055423, mailed Sep. 18, 2007.

* cited by examiner

TRANSFLECTIVE ELECTROWETTING DISPLAY DEVICE

This application is the U.S. national phase of International Application No. PCT/EP2007/055423, filed 1 Jun. 2007, which designated the U.S. and claims priority to Great Britain Application No. 0611125.6, filed 6 Jun. 2006, the entire contents of each of which are hereby incorporated by reference.

FIELD OF THE INVENTION

The invention relates to a transflective electrowetting display comprising a plurality of electrowetting elements having a first support plate facing a viewing side of the display and a second support plate facing a rear side of the display. A transflective display can form an image in a reflective mode using front lighting, e.g. by ambient light, and in a transmissive mode, using back lighting.

BACKGROUND OF THE INVENTION

A transflective electrowetting display is disclosed in international patent application WO2006/017129. This known display includes electrowetting elements having a partially, uniformly transmissive layer arranged on the second support plate. In a first mode the layer reflects ambient light incident from the viewing side and in a second mode it transmits light incident from the rear side. Each electrowetting element comprises a transparent liquid and a black or coloured liquid. The position of the latter liquid in the electrowetting element can be controlled to transmit or absorb light.

A disadvantage of the known transflective display is that the partially transmissive layer requires a special step in the manufacturing process and is therefore relatively expensive to make. Furthermore, the optical performance in the various modes depends on the values of the transmission and reflection coefficient of the layer and their spectral dependence, which will be affected strongly by variations in thickness. As a result, this manufacturing step will be a very yield sensitive step.

It is an object of the invention to provide a transflective display device which is cheaper to manufacture.

SUMMARY OF THE INVENTION

The object of the invention is achieved in a transflective display device having a viewing side and a rear side and comprising a plurality of electrowetting elements having a first support plate facing the viewing side and a second support plate facing the rear side, each electrowetting element comprising a space between the first support plate and the second support plate and including a first fluid and a second fluid immiscible with each other, the second fluid absorbing at least a part of the optical spectrum, the space having a cross-section in the plane of the second support plate and the position of the second fluid being controllable to cover a predetermined area of the cross-section, wherein a structured reflector is arranged on the second support plate comprising within the cross-section at least one area transparent for light incident from the rear side and at least one area reflective for light incident from the viewing side, the at least one transparent area and the at least one reflective area being arranged such that the predetermined area covered by the second fluid covers a proportion of the at least one transparent area and the same proportion of the at least one reflective area.

A transmissive area has preferably a coefficient of transmission higher than 70%; a reflective area has preferably a coefficient of reflection higher than 40%. Alternatively, the sum of the coefficient of transmission of a transmissive area and the coefficient of reflection of a reflective area is preferably larger than one. The quotient of the two proportions is preferably between 0.8 and 1.2. Each fluid may be a liquid or a gas. In general, the cross-section as used in this invention relates to that part of the area between the walls bounding the electrowetting element that forms a path for the light forming an image. Small areas, e.g. near the walls, may be excluded from the cross-section where such areas do not form part of the path, such as the area where the second fluid resides when totally contracted.

The structured reflector adds hardly any or no additional cost to the display manufacturing process as compared to the reflector for a reflective-only display device. The desired overall reflection and transmission can be achieved by choosing the relative sizes of the transparent and reflective areas.

The arrangement of the transparent area and the reflective area provides similar grey levels in front light mode and back light mode. Since the grey level in the front light mode is determined by the proportion of the reflective area covered by the second fluid and the grey level in the back light mode by the proportion of the transmissive area covered by the second fluid, same proportions will achieve the desired similarity of grey scales in the two modes. The same grey levels are also obtained in a mixed mode using both front light and back light. Hence, a voltage applied to an electrowetting element will result in similar grey scales in the reflective and transmissive mode. In other words, the so-called gamma curve is similar in both modes.

In a preferred embodiment of the device having similar grey scales, a borderline between the predetermined area and the area of the cross-section not covered by the second fluid is preferably movable in a direction parallel to a dividing line between the at least one transparent area and the at least one reflective area. When the borderline of the second fluid moves in this direction, it is relatively easy to arrange the transparent area and reflective area so as to achieve the same proportions being covered by the second fluid. When the cross-section of the electrowetting element is mirror symmetric along a line and the line forms the dividing line between the reflective area and the transparent area, a movement of the second fluid in a direction parallel to this line will maintain the same proportions. The borderline need not be a straight line but may be a curved line, which often has a lower energy state. The direction of motion of such a borderline, especially when initiating the motion and when completing the repulsion of the second fluid, may locally deviate from the direction parallel to the dividing line.

In a preferred embodiment the cross-section of the electrowetting cell has a rectangular shape and the transparent or reflective area is an elongate area having its longest dimension in the direction of a diagonal of the rectangular shape. A rectangle is defined as a rectilinear four-sided figure having all its angles right angles. The square is a species of the rectangle. The reflective area need not be an uninterrupted area but can be two areas separated by the elongate area. The elongate area may be transparent and surrounded by a reflective area or it may be reflective and surrounded by a transparent area. Motion of the second fluid along a diagonal of a rectangular cross-section can be accurately controlled. Hence, the arrangement of the transparent or reflective area along the diagonal allows an accurate control of the grey level.

In a special embodiment the structured reflector comprises a plurality of transparent areas or reflective areas uniformly distributed over the area of the cross-section. The cross-section may be a reflector provided with a plurality of transparent areas or holes. Alternatively, it may be transparent with a plurality of reflective areas. When the number of areas is larger than for instance 8, any change in the position of the borderline will change the proportions covered by the second fluid in a similar way.

Such a perforated pattern may give different gamma curves in the transmissive and reflective mode. For the mode belonging to the small areas, e.g. the transmissive mode for small transparent areas, the grey levels will substantially jump from one state to the other when the second liquid moves over a transparent area. This is advantageous, because such discrete grey levels are less sensitive to variations between pixels such as filling of the second liquid and insulator thickness. The mode belonging to the continuous area will vary more continuously, except when the borderline moves over one of the small areas, where the grey level will jump also in this mode. When the areas are larger, both modes will be continuous.

An advantage of the perforated pattern is that the grey scale is less dependent on the precise motion of the second liquid, both on the curvature of the borderline, on the position where the motion is initiated and on the position where the second liquid contracts to. This embodiment provides a great freedom for designing the motion of the second fluid.

The display device is preferably arranged such that the position of the second fluid is controllable to form grey levels. The control of the grey levels may include an analog voltage or a pulse-width modulated voltage.

The electrowetting element comprises preferably an initiator for controlling the direction of the motion of the second fluid. The initiator can be a special shape of hydrophobic surfaces and/or of the cross-section of the electrowetting element. The presence of an initiator realizes an improved predictability of the motion of the second fluid, thereby improving uniformity of grey levels over the image of the display device.

In a special embodiment a surface bounding the space and facing the rear side includes a local area having a wettability different from that of an adjacent area, the local area functioning as the initiator. The local area may be on the second support plate or on one or more walls of the electrowetting element. In an example where the first fluid is water and the second fluid is oil, the local area is a small hydrophilic area on the second support plate and the adjacent area is hydrophobic. On applying a voltage to the electrodes, the motion of the oil will start at the hydrophilic area.

In a further embodiment the shape of the cross-section of the electrowetting element functions as the initiator. For example, motion of the second fluid in an electrowetting element having a trapezoidal cross-section will start at the longer one of the two parallel sides. The various embodiments of the initiator may be combined.

A special embodiment of the display device includes a reflector arranged on the first support plate for directing light incident through the at least one transparent area via the at least one reflective area towards the viewing side.

Further features and advantages of the invention will become apparent from the following description of preferred embodiments of the invention, given by way of example only, which is made with reference to the accompanying drawings.

DETAILED DESCRIPTION OF THE INVENTION

Figure 1:
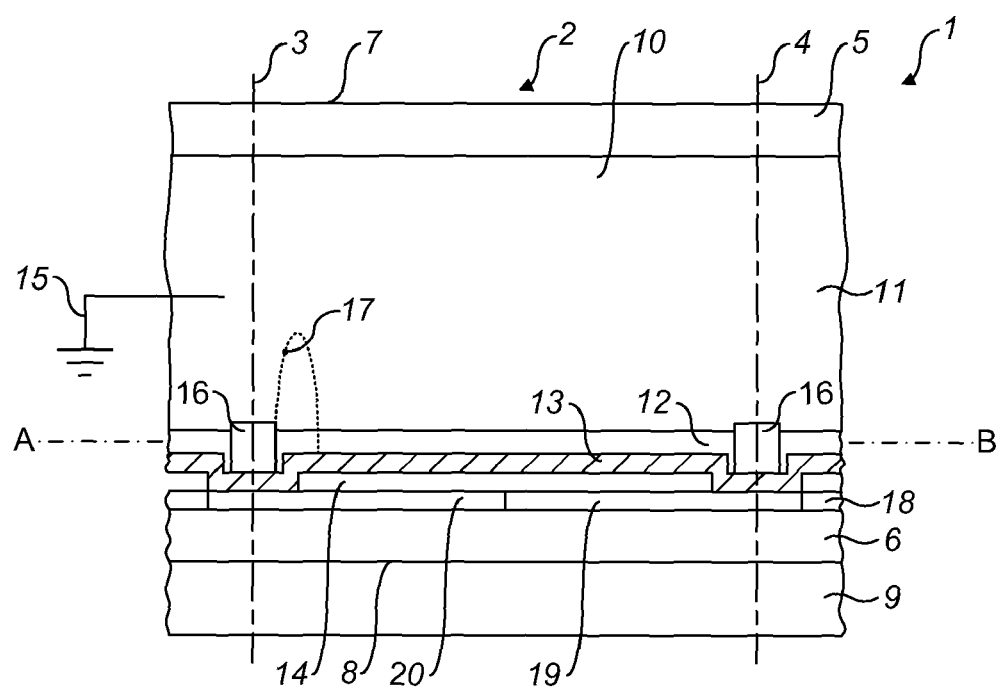
FIG. 1 shows a diagrammatic cross-section of a part of an embodiment of the display device.

FIG. 1 shows a diagrammatic cross-section of an embodiment of a transflective electrowetting display 1 device according to the invention. The display device includes a plurality of electrowetting elements 2, one of which is shown in the Figure. The lateral extent of the element is indicated in the Figure by the two dashed lines 3, 4. The electrowetting elements comprise a first support plate 5 and a second support plate 6. The support plates may be separate parts of each electrowetting element, but the support plates are preferably in common for the plurality of electrowetting elements. The support plates may be made for instance of glass or polymer and may be rigid or flexible.

The display device has a viewing side 7 on which an image formed by the display device can be viewed and a rear side 8. The first support plate faces the viewing side; the second support plate faces the rear side. The image is formed by light passing through each electrowetting element from the rear side 8 to the viewing side 7, where it is transmitted through the first support plate 5. The image is built up of picture elements. Each picture element may contain a single electrowetting element. Alternatively, each picture element may contain a plurality of electrowetting elements, each electrowetting element forming a sub-picture element. The latter picture element may for example include three sub-picture elements provided with colour filters for red, green and blue, thereby forming an RGB picture element.

An illumination unit 9 may be attached to the rear side 8 of the plurality of light valves to provide backlighting of the electrowetting elements. The illumination unit may comprise a single white light source. It may also comprise a plurality of colour light sources for spectrum sequential operation of the display. The colours of the light sources may for example be yellow and blue. The light sources may be conventional light sources, such as fluorescent lamps or LED's. The illumination unit may be of a conventional construction, such as disclosed for instance in international patent application WO 2006/011101.

A space 10 between the support plates is filled with two liquids: a first liquid 11 and a second liquid 12. The first liquid is immiscible with the second liquid. The first liquid is electrically conductive or polar, and may be a water or salt solution such as a solution of KCl in a mixture of water and ethyl alcohol. The first liquid is preferably transparent. The second liquid is electrically non-conductive and may for instance be an alkane like hexadecane or (silicone) oil. A hydrophobic layer 13 is arranged on the support plate 6, facing the space 10. The layer may be an uninterrupted layer extending over a plurality of electrowetting elements or it may cover only the cross-section of one electrowetting element. The layer may be for instance an amorphous fluoropolymer layer such as AF1600 or other low surface energy polymers such as Parylene. The hydrophobic character causes the second liquid to adhere preferentially to the support plate 6.

Each electrowetting cell includes an electrode 14 arranged on the support plate 6. The electrode is separated from the liquids by an insulator, which may be said hydrophobic layer 13. In general, the electrode has the same shape as the cross-section of the electrowetting element. A second electrode 15 is connected to the conductive first liquid 11. This electrode can be common to a series of electrowetting cells that share the second liquid, uninterrupted by walls. The electrodes on the support plate 6 are connected to an electrical terminal on the support plate by a matrix of printed wiring. The electrodes 14 and wiring are preferably transparent and made of e.g. indium tin oxide. The matrix may include switching elements such as transistors; in this case the matrix is called an active matrix.

The lateral extent of the second liquid 12 is constrained to one electrowetting element by walls 16 that follow the cross-section of the electrowetting cell. Further details of the electrowetting cell and its manufacture are disclosed amongst others in international patent application WO 2005/098797.

The second liquid absorbs at least a part of the optical spectrum. The liquid may be transmissive for a part of the optical spectrum, forming a colour filter. For this purpose the liquid may be coloured by addition of pigment particles or dye. Alternatively, the liquid may be black, i.e. absorb substantially all parts of the optical spectrum.

When a nonzero voltage is applied between the electrodes 14 and 15, electrostatic forces will move the first liquid 11 towards the electrode 14, thereby repelling the second liquid 12 from the area of the electrode 14 to the walls 16 surrounding the area of the electrode, schematically indicated by a dashed line 17. This action removes the second liquid from the optical path that runs from the rear side 8 to the viewing side 7 through the electrowetting element. When the voltage is returned to zero, the second liquid flows back to cover the hydrophobic layer 13. In this way the second liquid forms an electrically controllable light switch.

A structured reflector 18 is arranged on the support plate 6. The structured reflector comprises transparent areas and reflective areas. The embodiment of FIG. 1 comprises one transparent area 19 and one reflective area 20 within the cross-section of the electrowetting element 2. When the second liquid 12 is in the repelled state as indicated by numeral 17, light from the illumination unit 9 will be transmitted to the viewing side 7 of the display device and ambient light incident from the viewing side will be reflected from the reflective area 20 and returned to the viewing side. When the second liquid 12 covers the hydrophobic layer 13, both light from the illumination unit and from the ambient will be absorbed in the second liquid. An image formed by the plurality of electrowetting elements will be visible in any ambient light level, from bright sunlight to darkness.

The ratio of the transparent area over the reflective area can be chosen independence on the use of the display device. A display device for indoor use can be designed to make optimum use of the relatively small amount of light available from the illumination unit 9. The efficiency of the use of the light is increased when the ratio is larger than 1, for instance 4. A display device for outdoor use can be designed to make optimum use of the ambient light, and use the illumination unit only for providing some light under low ambient light conditions. In such a case the ratio is preferably smaller than one, for instance 0.1.

In the above description of the electrowetting cell the second liquid 12 either covers the area of the electrode 14 or is removed from it. International patent application WO 2003/071346 discloses measures that allow the second liquid to cover the area of the electrode 14 only partially, thereby realizing so-called grey values.

The grey values may be obtained by applying an analog voltage to the electrowetting cell that positions the second liquid to cover the area of the electrode only partially. Grey values may also be obtained by applying a pulse-width modulated voltage to the electrowetting cell.

Figure 2:
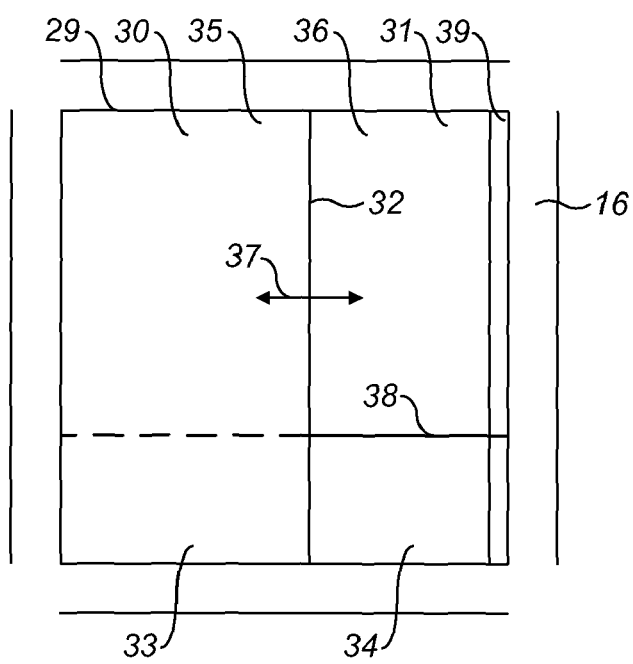
FIG. 2 shows a cross-section of a first embodiment of the electrowetting element.

FIG. 2 shows a cross-section 29 of the space 1 of a first embodiment of the electrowetting element 2 along the line A-B in FIG. 1 as seen from the viewing side. The second liquid covers a predetermined area 30 of the cross-section. A borderline between the predetermined area 30 and the area 31 of the cross-section not covered by the second liquid is indicated by numeral 32. The transparent area of the structured reflector is now divided in an area 33 covered by the second liquid and an area 34 not covered by the second liquid. Similarly, the reflective area of the structured reflector is divided in an area 35 covered by the second liquid and an area 36 not covered by the second liquid. The control of the position of the second liquid can move the borderline 32 in a direction 37. Although the Figures show the borderline 32 as a straight line, it may also be a curved line. The curvature is preferably mirror symmetric around the direction of motion. In the position shown in the Figure, the area 30 covered by the second liquid covers the same proportions of the total transparent area and the total reflective area. In other words, the ratio area 33/(area 33+area 34) is substantially equal to (area 35/(area 35+area 36). As a result, the gamma curve of the grey levels in the image will be very similar in each illumination mode, whether by back light, ambient light or a combination of the two.

The direction of motion 37 is parallel to a dividing line 38 between the transparent area and the reflective area, thereby obtaining the same proportions of the transparent area and the reflective area being covered by the second fluid. This direction of motion of the second liquid can be achieved, for instance, by arranging a small layer 39 of hydrophilic material along the wall 16. The hydrophilic layer 39 can be arranged on top of the hydrophobic layer 13, to replace locally the hydrophobic layer 13 or to cover the side of wall 16 facing the space 10. The hydrophilic layer 39 operates as an initiator for the oil motion. When the voltage between the electrodes 14 and 15 is turned on, the first liquid 11 will start to repel the second liquid 12 along the hydrophilic layer 39 in the direction 37.

Figure 3:
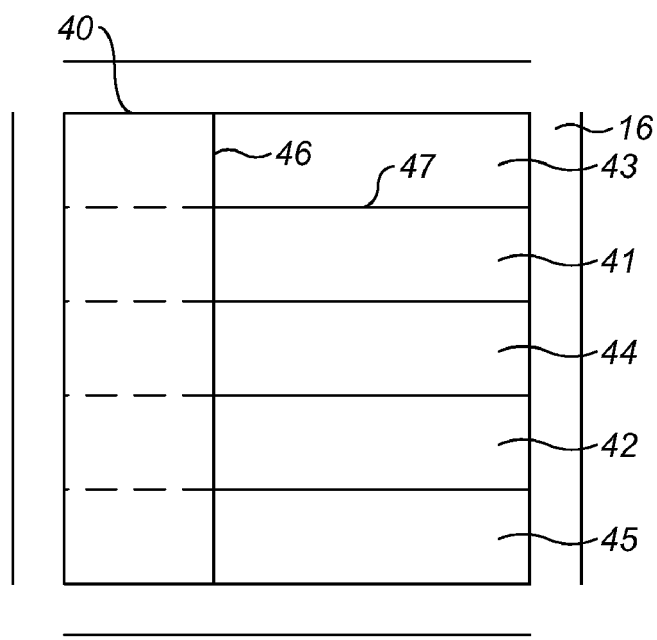
FIG. 3 shows a cross-section of a second embodiment of the electrowetting element.

FIG. 3 shows a cross-section 40 of a second embodiment of the electrowetting element as seen from the viewing side. The structured reflector comprises a plurality of transparent and reflective areas: two transparent areas 41, 42 and three reflective areas 43, 44, 45. In the state of the electrowetting element shown, the second liquid covers the area of the cross-section to the left of the borderline 46. Similar to FIG. 2, the parts of the dividing lines between the transparent areas and the reflective areas that are covered by the second liquid are shown as dashed lines. When the borderline moves in a direction parallel to the dividing line 47 between the reflective area 43 and the transparent area 41, the proportions of the transparent areas and the reflective areas covered by the second liquid remain substantially equal.

Figure 4:
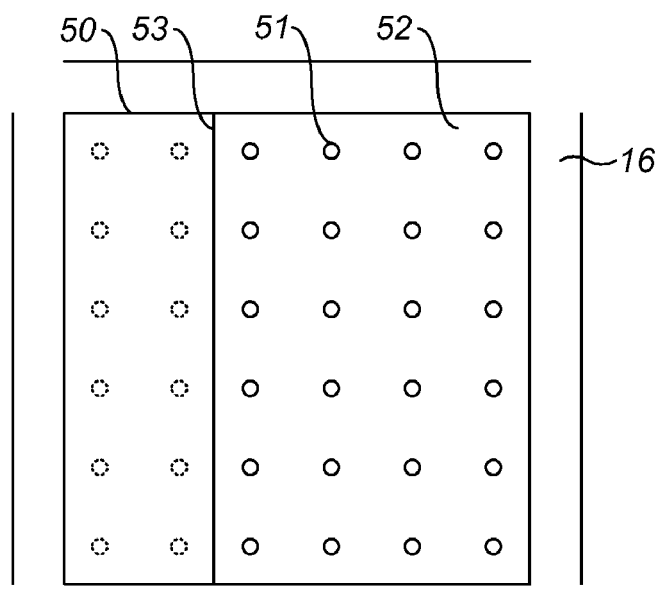
FIG. 4 shows a cross-section of a third embodiment of the electrowetting element.

FIG. 4 shows a cross-section 50 of a third embodiment of the electrowetting element as seen from the viewing side. The structured reflector comprises a plurality of transparent areas 51, each of which is enclosed by a reflective area 52. The transparent areas may be arranged in the form of a regular array as shown in the Figure. Alternatively, the transparent areas may be arranged randomly within the cross-section. The part of the cross-section on the left of borderline 53 is covered by the second liquid. The number of transparent areas in the cross-section may be chosen in dependence on the desired behaviour of the grey level as a function of the position of the borderline 53. When the number of transparent areas becomes larger, the dependence of the grey level on the position of the borderline will better approximate a linear function. In this embodiment the proportions of transparent areas and reflective area covered by the second liquid is substantially independent of the direction of motion of the second liquid. In an alternative embodiment, the structured reflector comprises a plurality of reflective areas, each of which is enclosed by a transparent area.

Figure 5:
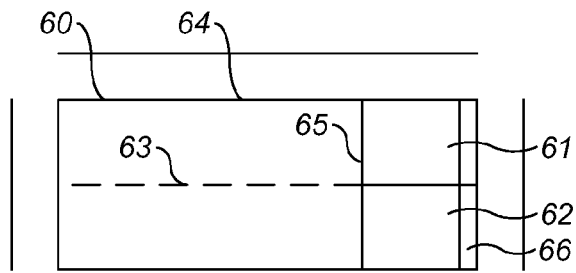
FIG. 5 shows a cross-section of a fourth embodiment of the electrowetting element.

FIG. 5 shows a cross-section 60 of a fourth embodiment of the electrowetting element as seen from the viewing side. The cross-section is a rectangle having unequal adjacent sides. The structured reflector comprises a transparent area 61 and a reflective area 62, having a dividing line 63 parallel to the longest dimension 64 of the cross-section. A borderline 65 separates the area covered by the second liquid and the area not covered by the second liquid. When the voltage between the electrodes changes, the borderline moves in a direction parallel to the dividing line 63. The shape of the cross-section in this embodiment operates as an initiator, i.e. a mechanism controlling the start and the direction of motion of a second liquid. When a voltage is applied in a state where the second liquid covers the entire cross-section, the liquid will in general start moving in a direction where it forms the shortest borderline 65. The definition of the motion can further be improved by applying the hydrophilic layer 66, similar to the layer 39 in FIG. 2, on the second support plate.

Figure 6:
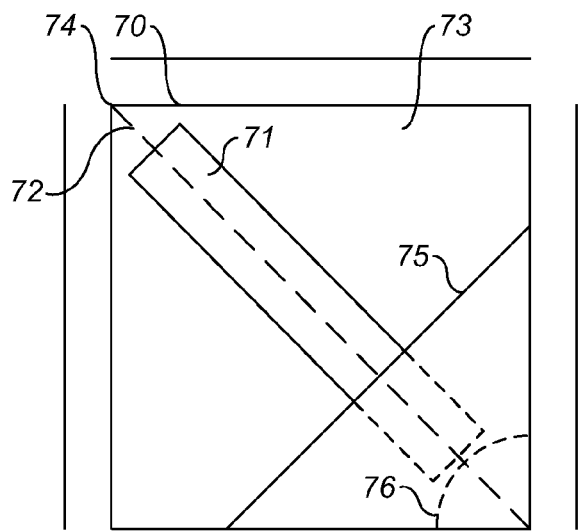
FIG. 6 shows a cross-section of a fifth embodiment of the electrowetting element.

FIG. 6 shows a cross-section 70 of a fifth embodiment of the electrowetting element as seen from the viewing side. The cross-section has a rectangular shape. The structured reflector comprises a transparent area 71 having an elongate shape with its longest dimension in the direction of a diagonal 72 of the rectangular shape. The transparent area is surrounded by a reflective area 73. Motion of the second liquid is initiated in a corner 74 of the rectangle on said diagonal. A small hydrophilic layer in the corner 74 may be used as initiator. When the voltage is increased, the borderline 75 will move in a direction parallel to the diagonal. A preferred position for the second liquid to move to may be created by omitting a corner section from the otherwise rectangular electrode on the second support plate, as indicated in the Figure by the dashed line 76.

Figure 7:
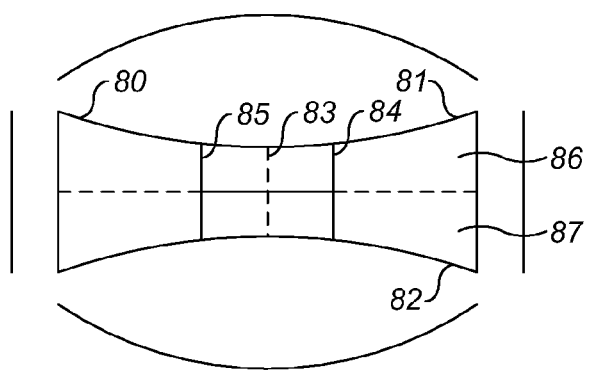
FIG. 7 shows a cross-section of a sixth embodiment of the electrowetting element.

FIG. 7 shows a cross-section 80 of a sixth embodiment of the electrowetting element as seen from the viewing side. Two opposite sides 81, 82 of the cross-section are curved inward, thereby creating a smallest cross-section 83 of the second liquid away from the sides of the cross-section. The shape of the cross-section functions as initiator of the motion of the second liquid. The motion of the second liquid will initiate at the smallest cross-section. When increasing the voltage, two borderlines 84, 85 will move in opposite directions. The initiation may be reinforced by arranging a small hydrophilic layer on the second support plate at both sides of the cross-section 83. The structured reflector comprises a transparent area 86 and a reflective area 87.

Figure 8:
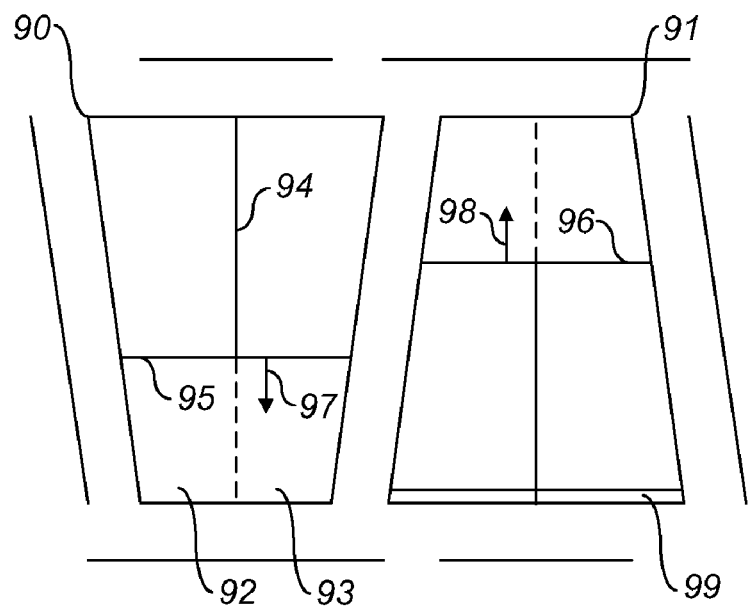
FIG. 8 shows a cross-section of a seventh embodiment of the electrowetting element.

FIG. 8 shows cross-sections 90, 91 of two adjacent electrowetting elements according to a seventh embodiment as seen from the viewing side. The cross-sections have a trapezoidal shape and each comprise a transparent area 92 and a reflective area 93. The shape is mirror symmetric along the dividing line 94 of the transparent area and the reflective area. At increasing voltage the borderlines 95 and 96 will move from the longer side to the shorter side of the trapezoidal shape as indicated by the arrows 97 and 98, respectively. The initiation of the motion may be improved by providing a small hydrophilic layer on the second support plate near the longer side as schematically indicated in the Figure by reference numeral 99. Other examples of shape-determined initiation are disclosed in international patent application WO 2006/021912.

Figure 9:
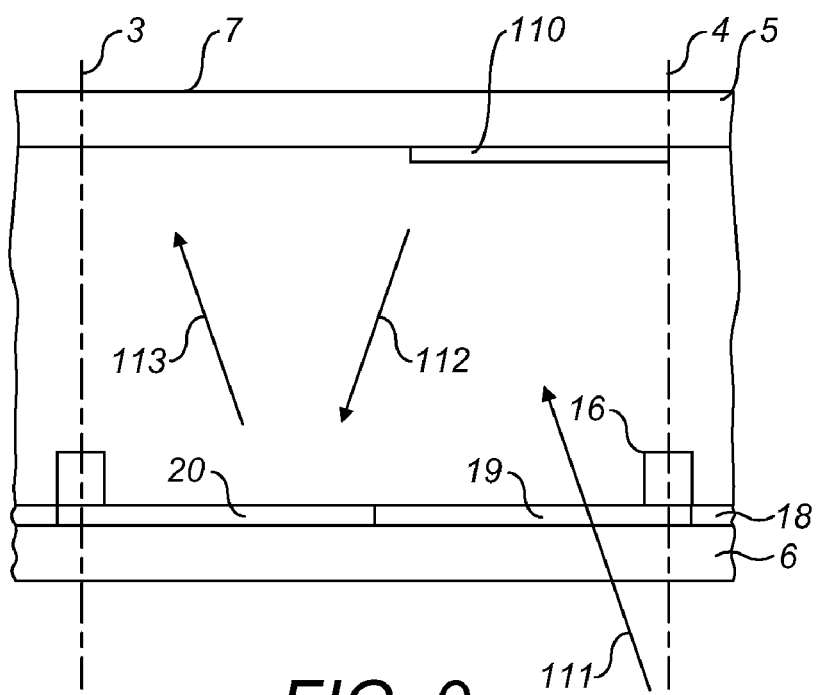
FIG. 9 shows a diagrammatic cross-section of a part of another embodiment of the display device.

FIG. 9 shows a diagrammatic cross-section of an embodiment of the display device similar to the one shown in FIG. 1 in a plane perpendicular to the planes of the support plates. The figure shows only features relevant for explaining this embodiment. A reflecting layer 110 has been arranged on the first support plate 5 above the transparent area 19 of the structured reflector 18. Light incident through the transparent area 19 as indicated by a 111 will be reflected by the reflecting layer 110 towards the reflective area 20 of the structured reflector 18, as indicated by arrow 112. After a second reflection the light is directed towards the viewing side 7, as indicated by arrow 113. The reflecting layer 110 may be arranged in a slanting position to reflect light incident perpendicularly to the transparent area 19 towards the reflective layer 20. The reflecting layer 110 may be used in any embodiment of the display device according to the invention, in particular the embodiments shown in the Figures. An advantage of the reflecting layer is that the layer of the second liquid can be made thinner, as the light now passes it three times. This results in a lower operating voltage. If, alternatively, the thickness is kept the same, a more saturated colour, i.e. a larger colour gamut is obtained.

Although most cross-sections shown in the above embodiments are rectangular, it will be clear that any shape is possible, in particular round and triangular.

The above embodiments of the display device have the electrode 14 arranged on the second support plate 6 and the second fluid 12 situated at the rear side of the space 10 of the electrowetting element. Alternatively, the electrode may be arranged on the first support plate 5 and the second fluid at the viewing side of the space 10.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A transflective display device having a viewing side and a rear side and comprising a plurality of electrowetting elements having a first support plate facing the viewing side and a second support plate facing the rear side, each electrowetting element comprising a space between the first support plate and the second support plate and including a first fluid and a second fluid immiscible with each other, the second fluid absorbing at least a part of the optical spectrum, the space having a cross-section in the plane of the second support plate and the position of the second fluid being controllable to cover a predetermined area of the cross-section for forming a grey level, wherein a structured reflector is arranged on the second support plate comprising within the cross-section at least one area transparent for light incident from the rear side and at least one area reflective for light incident from the viewing side, the at least one transparent area and the at least one reflective area being arranged such that the predetermined area covered by the second fluid covers a proportion of the at least one transparent area and the same proportion of the at least one reflective area.

2. A transflective display device according to claim 1, wherein a borderline between the predetermined area and the area of the cross-section not covered by the second fluid is movable in a direction parallel to a dividing line between the at least one transparent area and the at least one reflective area.

3. A transflective display device according to claim 1, wherein the cross-section has a rectangular shape and the transparent or reflective area is an elongate area having its longest dimension in the direction of a diagonal of the rectangular shape.

4. A transflective display device according to claim 1, wherein the structured reflector comprises a plurality of transparent areas or reflective areas uniformly distributed over the area of the cross-section.

5. A transflective display device according to claim 1, wherein the control of the grey levels includes an analog voltage.

6. A transflective display device according to claim 1, wherein the control of the grey levels includes a pulse-width modulated voltage.

7. A transflective display device according to claim 1, wherein the electrowetting element comprises an initiator for controlling the direction of the motion of the second fluid.

8. A transflective display device according to claim 7, wherein a surface bounding the space and facing the rear side includes a local area having a wettability different from that of an adjacent area, the local area functioning as the initiator.

9. A transflective display device according to claim 7, wherein the shape of the cross-section functions as the initiator.

10. A transflective display device according to claim 1, wherein a reflector is arranged on the first support plate for directing light incident through the at least one transparent area via the at least one reflective area towards the viewing side.

11. A transflective display device according to claim 1, wherein the at least one transparent area and the at least one reflective area provide similar grey levels in front light mode and back light mode.

\* \* \* \* \*